United States Patent [19]

Bjervig

[11] 4,020,607
[45] May 3, 1977

[54] SEALING DEVICE

[76] Inventor: Leon Hans-Hother Bjervig, Osterbyhirst Madum DK-6990, Ulfborg, Denmark

[22] Filed: Oct. 29, 1975

[21] Appl. No.: 626,944

Related U.S. Application Data

[63] Continuation-in-part of Ser. No. 460,239, April 11, 1974, abandoned.

[52] U.S. Cl. .............................. 52/173 DS; 52/2; 49/477
[51] Int. Cl.² .......................................... E06B 7/23
[58] Field of Search ............. 52/2, 173 DS; 49/477; 220/239, 232, 240; 277/34

[56] References Cited

UNITED STATES PATENTS

| 2,701,899 | 2/1955 | Krupp | 49/477 |
|---|---|---|---|
| 2,763,038 | 9/1956 | Hagerty | 49/477 |
| 3,042,980 | 7/1962 | Brinsmade | 49/477 |
| 3,161,229 | 12/1964 | Sanders | 49/477 |
| 3,303,615 | 2/1967 | O'Neal | 52/2 |
| 3,424,222 | 1/1969 | Stoner | 49/477 |
| 3,516,471 | 6/1970 | Harkins | 49/477 |
| 3,693,831 | 9/1972 | West | 220/232 |

FOREIGN PATENTS OR APPLICATIONS

| 1,418,053 | 10/1965 | France | 277/34 |
|---|---|---|---|
| 1,278,811 | 11/1961 | France | 49/477 |
| 1,806,315 | 5/1970 | Germany | 49/477 |
| 502,275 | 3/1939 | United Kingdom | 49/477 |

Primary Examiner—Ernest R. Purser
Assistant Examiner—Henry Raduazo
Attorney, Agent, or Firm—Ladas, Parry, Von Gehr, Goldsmith & Deschamps

[57] ABSTRACT

The sealing device disclosed herein is designed for providing an air tight seal between a door casing and the sides of a vehicle positioned adjacent the casing. It comprises an elongated rigid angular profile having flanges which define a channel-shaped space therebetween and a resilient and collapsible pad structure fastened in the channel-shaped space between the flanges of the angular profile. The pad structure includes a collapsible spongy material enclosed in an air tight envelope, and the interior of the pad communicates with a vacuum source. In its distended position, the material inside the pad structure will cause the pad to expand a considerable distance beyond the flanges of the angular profile so as to abut the sides of the vehicle thereby providing an air tight seal. When a vacuum is applied to the collapsible material, the pad structure will collapse and be retracted almost completely into the channel-shaped space between the flanges of the profile. The sealing device is then in its inoperative position leaving a free space between the profile and the walls of the vehicle.

5 Claims, 7 Drawing Figures

SEALING DEVICE

This application is a continuation-in-part of Ser. No. 460,239 filed Apr. 11, 1974 and now abandoned.

This invention generally relates to sealing structures and more particularly to a scaling device for providing an air tight seal between a door opening and the rear end of a vehicle positioned adjacent the door opening.

In such cases, the sealing device must be capable of compensating for lateral and vertical disalignment between the door and the vehicle and consequently it is required that the sealing device must be capable of relatively large displacements, e.g. of the order of some 20 – 25 centimers (about 10 inches).

The main object of the invention is to provide a sealing device which satisfies this requirement.

Another object is to provide a simple and inexpensive vacuum operated sealing device which can readily be mounted on a frame structure intermediate the door opening and the rear end of a vehicle.

A further object is to provide improved means for connecting the interior of a collapsible sealing pad to a vacuum source.

Other objects will appear from the following description with reference to the drawings.

Figure 1:
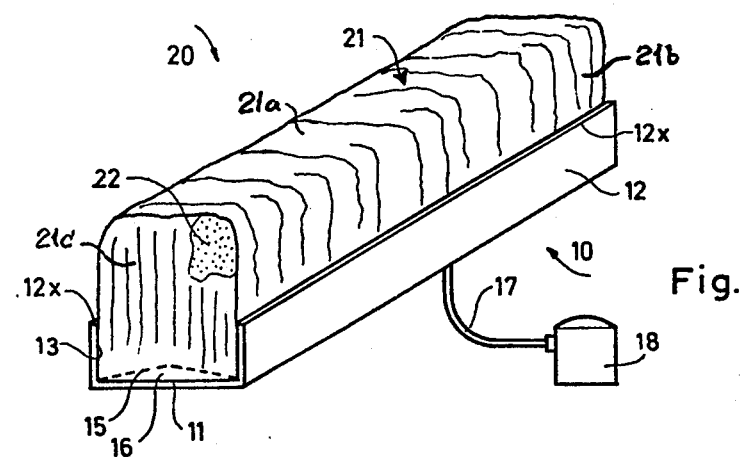
FIGS. 1 and 2 are perspective views showing a sealing structure according to the invention with the collapsible sealing material in its distended and retracted positions respectively.
Figure 2:
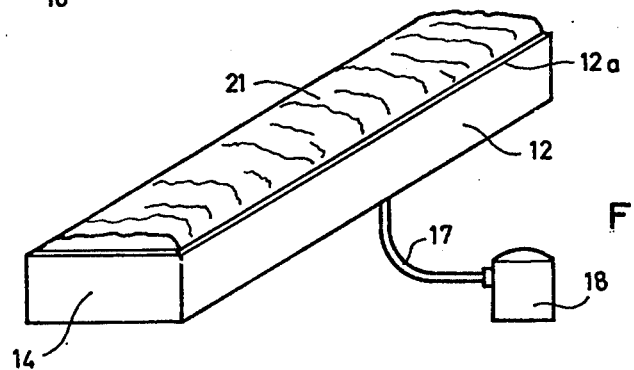

Referring now particularly to FIG. 1 and 2 of the drawings, there is shown a sealing structure comprising a rigid, elongated fastening member generally designated as 10 constituted by a substantially U-shaped angular profile 11 having flanges 12 defining an open channel-shaped space 13 therebetween.

Mounted within the channel 13 is a collapsible, elongated sealing member constituted by an elongated pad structure generally designated 20 having a flexible wall or skin 21 defining a casing having an upper surface 21a and side faces 21b. Enclosed in the casing 21 is a collapsible resilient material 22 such as an open celled spongy material capable of holding the pad structure 20 expanded into the position shown in FIG. 1 wherein it extends a considerable distance above the upper edge 12x of the flanges 12 of the fastening member 10. Preferably, this distance should be about double the height of the flanges 12. This distance represents the maximum displacement of the sealing structure.

Adjacent the bottom 11 of the channel 13 is a perforated plate member 15 of triangular cross section defining a space 16 between the bottom 11 and the collapsible material 22 of the sealing pad 20. This space 16 communicates with a hose 17 which is connected to a vacuum source 18. This way be a conventional vacuum cleaner or any other convenient suction device.

When applying a vacuum to the space 16 which communicates with the collapsible material 22 through the apertures in the plate 15, this material will collapse and be retracted completely into the channel 13 as shown in FIG. 2.

When mounted on a frame member surrounding a door opening, the sealing structure may form a closed rectangular frame without any open ends. On the other hand, the sealing member may also be shaped as an elongated trough having two ends, in which case the ends of the member 10 must be closed by end plates 14 as shown in FIG. 2 and the pad structure 20 must likewise be covered at both ends by a flexible wall or skin 21c as shown in FIG. 1.

Figure 3:
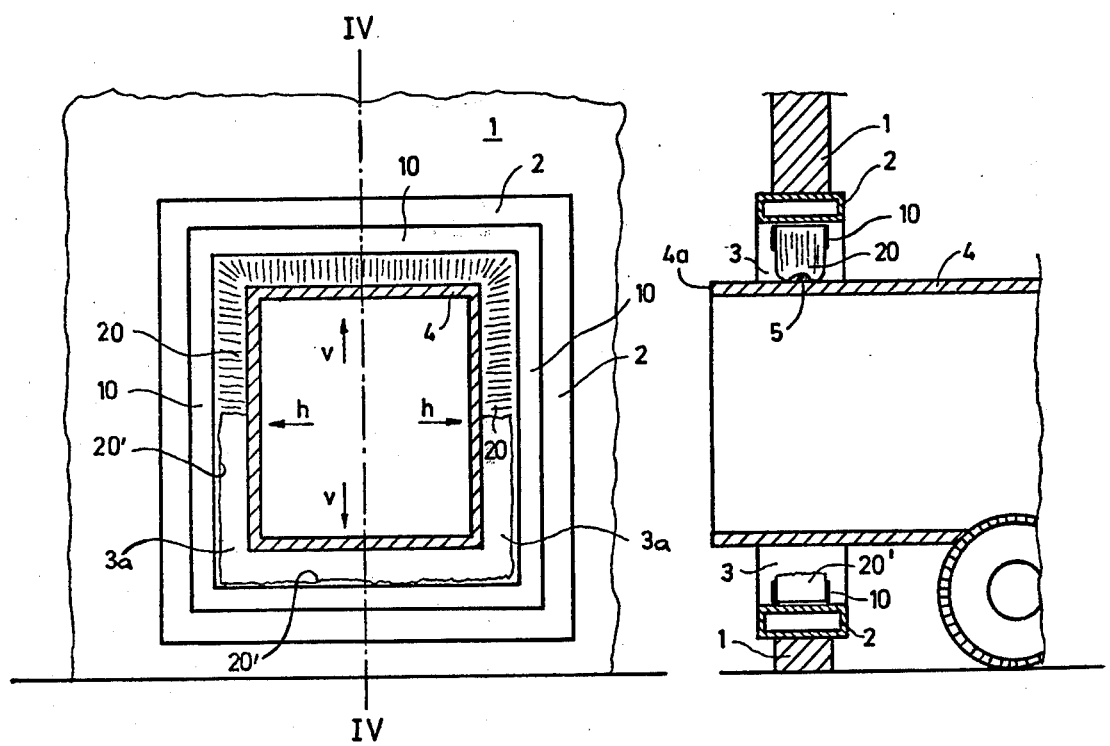
FIG. 3 is a front elevation showing a door casing provided with a sealing device and cross-sectional view of the rear end of a vehicle positioned adjacent the casing.
Figure 4:
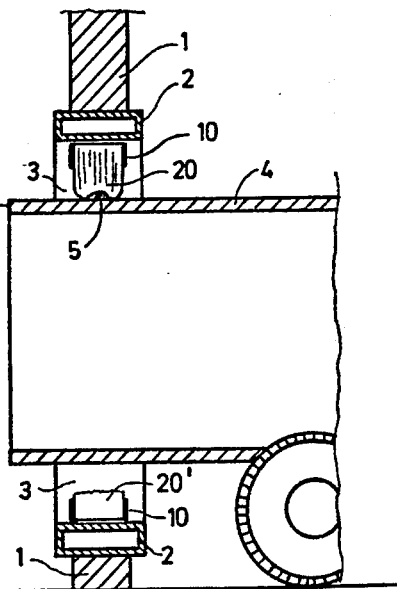
FIG. 4 is a section taken on the line IV-IV og FIG. 3.

In FIGS. 3 and 4 there is shown a wall 1 with a door casing 2 surrounding a door opening 3. The rear end 4 of a vehicle extends through the door opening 3 so as to be capable of vertical and lateral displacements relatively to the casing 2 as indicated by the arrows v and h. Mounted on the inner face of the casing adjacent the door opening 3 is a sealing device of the structure shown in FIGS. 1 and 2. In the upper half of the frame 2 of FIG. 3 the sealing device 10, 20 is shown in its distended position corresponding to FIG. 1 wherein the collapsible pad structure 20 is expanded so as to abut the outer walls of the vehicle 4 thus providing an air tight seal between the casing 2 and the vehicle 4. In the lower half of the casing 2 of FIG. 3 the sealing device is shown in its retracted position corresponding to FIG. 2, wherein the collapsible pad structure 20 is retracted almost completely into the channel shaped cavity of the fastening member 10 leaving a free space 3a between the casing 2 and the vehicle 4 so as to enable the latter to move freely in its lengthwise direction. It will be understood that the two positions of the sealing device shown in the upper and lower half of the casing 2 in FIG. 3 are shown in this manner only for the sake of convenience and that in actual use the whole of the sealing device surrounding the door opening is either in its distended or in its retracted position. Likewise for the sake of convenience, the vacuum means 17 and 18 shown in FIGS. 1 and 2 have been omitted in FIGS. 3 and 4.

The rear end face of the vehicle 4 is designated as 4a in FIG. 4 and on the upper wall or roof of the vehicle 4 there is shown a projection 5 to illustrate that the sealing device will function properly to provide an air tight seal even in such cases where the surface of the vehicle presents irregularities such as the projection 5.

Figure 5:
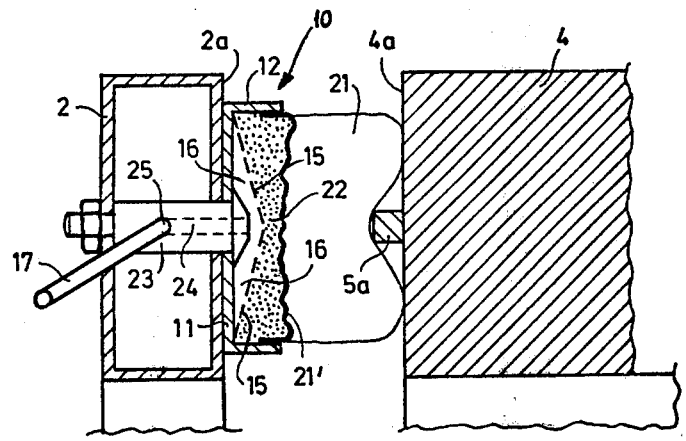
FIG. 5 is an enlarged cross section of one embodiment of the sealing device.

This is shown more clearly in the enlarged sectional view of FIG. 5 where the sealing device is mounted on the external face 2a of the hollow frame structure constituting the door casing facing the rear end face 4a of the vehicle. In this embodiment, the fastening member 10 of the sealing device comprising the bottom 11 of the channel-shaped cavity and the two flanges 12 is mounted on the face 2a of the frame 2 by means of hollow bolts 23 extending through the frame 2 and provided with an interior channel 23 which communicates with the space 16 intermediate the bottom 11 and the perforated plate 15 and through the apertures therein with the collapsible material 22 inside the pad structure 21, 22. A hole 25 in the bolt 23 communicates with the channel 24 therein and is adapted to connect a vacuum hose 17 to collapse the pad structure and retract it into the channel of the fastening member 10, as shown in the thick lines of FIG. 5. When the vacuum is released the pad structure will be distended and will expand until it abuts the end face 4a of the vehicle 4 as shown by the thin lines in FIG. 5. A projection 5a on this face will cause the collapsible material to be compressed so as to form a cavity in the end face of the pad structure surrounding the projection 5a, but this projection will not interfere with the sealing effect of the device.

Figure 6:
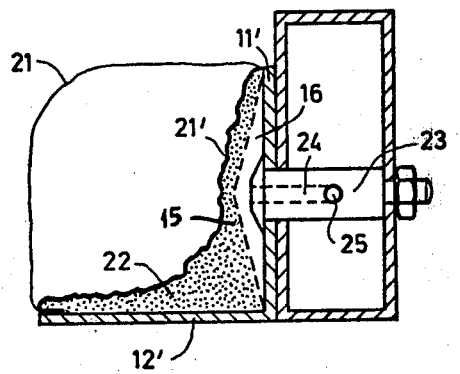
FIG. 6 is a similar cross section of another embodiment of the sealing device.

In the embodiment shown in FIG. 6, the fastening member comprises an angular profile having flanges 11' and 12' but otherwise the construction and operation of this sealing device is the same as described with reference to FIG. 5.

Figure 7:
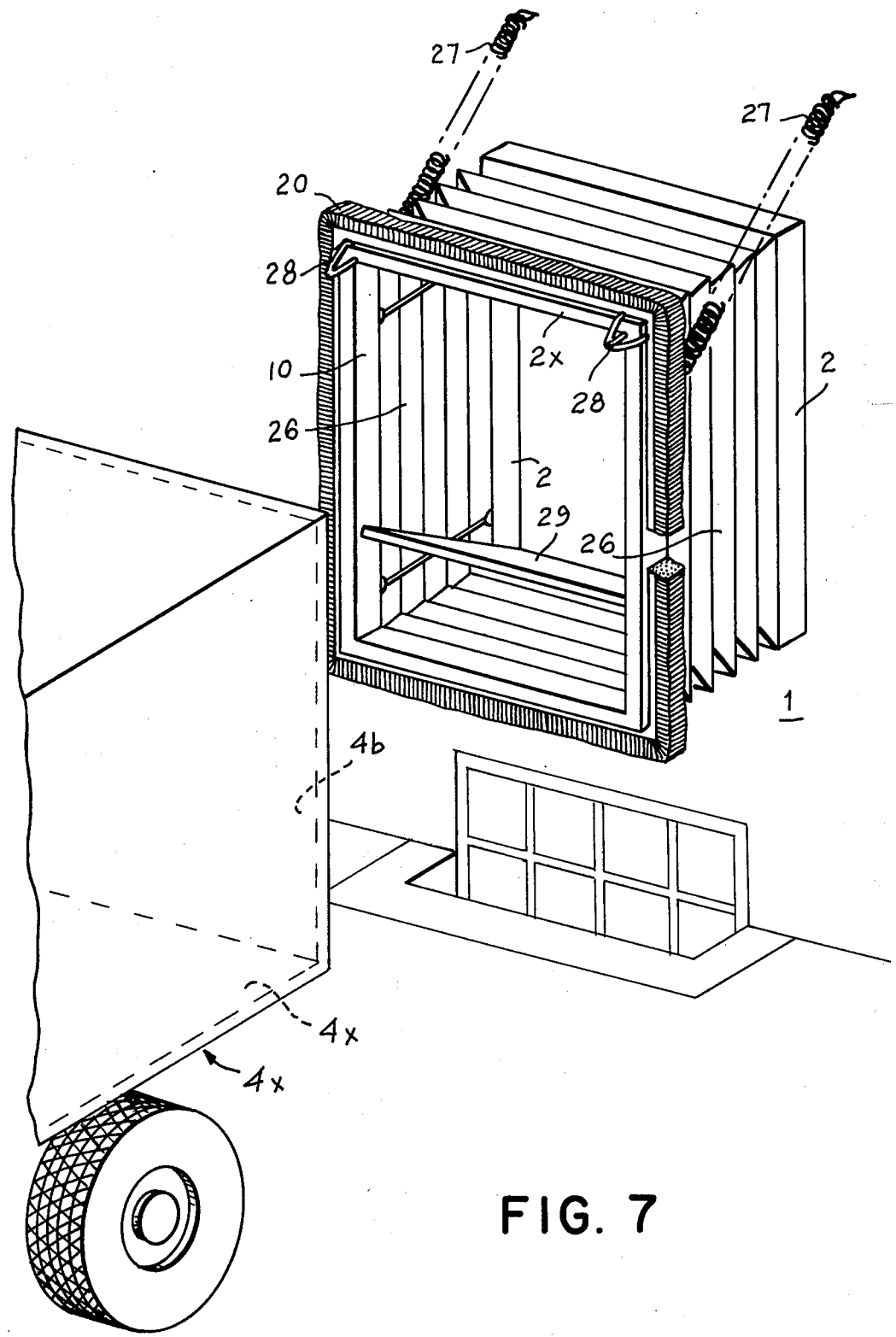
FIG. 7 is a perspective view showing a modified arrangement of the sealing device mounted on a separate frame suspended from a wall in a vertical plane parallel to the door casing.

In the perspective view shown in FIG. 7 there is shown a modified arrangement wherein the sealing device 10,20 is mounted on the external face of a frame 2x resiliently suspended from the wall 1 at a distance from the door casing 2 by means of springs 27 so as to be capable of lateral and horizontal displacements relatively to the casing 2. The frames 2 and 2x are interconnected by means of a flexible member 26 providing an air tight seal between the upper horizontal sides and the two vertical sides of the two frames so as to form a short flexible corridor therebetween. The gap between the floor 4x of the vehicle 4 and the lower horizontal side of the door casing is bridged by an air tight member 29. With this arrangement, the outer face of the seal carrying frame 2x needs only to be provided with the sealing device along the upper horizontal side and the two vertical sides of the frame, the sealing of the bottom being provided by the bridge member. The sealing device disposed in this manner along the outer faces of the frame 2x provides for an air tight seal between this frame and the inner side walls 4b of the vehicle, when the latter is backed into a position, where the frame 2x is introduced into the cavity of the vehicle defined by the two side walls, the top wall and the floor thereof. The alignment of the frame 2x with the rear end of the vehicle during the movement thereof into the operative position of the sealing device may be facilitated by guiding members 28 disposed at the upper corners of the frame 2x and adapted to grip the inner walls of the vehicle.

What I claim is:

1. A closure assembly for sealing the space between a door opening and the open rear end of a vehicle positioned adjacent the door opening and comprising a frame structure intermediate the vehicle and the door opening and a sealing device mounted on the frame structure adjacent the rear end of the vehicle and comprising:
    a. a rigid, elongated fastening member constituted by an angular profile having flanges defining an open channel-shaped space therebetween;
    b. a collapsible, elongated sealing member constituted by an elongated pad structure having an air-tight, flexible wall defining a casing and a collapsible resilient material enclosed therein to hold the pad structure distended, the sealing member being mounted within the channel-shaped space in the fastening member and extending outwardly therefrom beyond said channel-shaped space;
    c. vacuum means connected to the channel-shaped space in the fastening member and communicating with the interior of the pad structure, the vacuum means being operable to apply vacuum to the pad structure to collapse the pad structure and cause the same to be wholly retracted into the channel-shaped space in the fastening member;
    d. clamping bolts connecting the fastening member with the frame structure and each formed with a channel communicating with the interior of the pad structure and with at least one side opening adapted to connect the channel with the vacuum means for collapsing the pad structure; and
    e. a perforated plate member disposed within the channel-shaped space defined by the fastening member and intermediate the clamping bolts and the interior of the collapsible pad structure.

2. A sealing device comprising:
    an elongated rigid profile having a pair of flanges defining an elongated channel-shaped cavity therebetween;
    a collapsible pad structure within said cavity, said pad structure comprising
    a. a collapsible and compressible open-celled spongy material, and
    b. a cover enclosing said material and comprising a flexible air-tight skin attached to said flanges and extending across the cavity therebetween, so as to cover said material along the upper face and side faces of the pad structure, but leaving the bottom face thereof open; and
    vacuum means communicating with the bottom face of said pad structure, the arrangement of said cover and the resiliency of said material being such that when no vacuum is applied to said material and said material is therefore distended, the pad structure extends outwardly beyond the flanges by a distance which is at least equal to the height of the flanges, whereas when vacuum is applied and said material is therefore collapsed, the pad structure is substantially completely retracted into the cavity between the flanges.

3. A sealing device comprising:
    an elongated rigid profile having a pair of flanges defining an elongated channel-shaped cavity therebetween,
    an air-tight flexible wall attached to said flanges and extending across said cavity, so as to form an air-tight cover,
    the width of said cover being substantially greater than the width of the cavity, so as to enable the cover to be raised above the edges of the flanges,
    a resilient, open-celled, spongy material enclosed in the cavity between the flanges and filling the interior of the air-tight cover, so as to constitute a pad structure extending above the flanges by a distance which is at least equal to the height of the flanges, and
    vacuum means communicating with the interior of the pad structure and adapted to collapse said material, so as to cause the pad structure to be completely retracted into the cavity between the flanges.

4. A closure assembly for sealing the space between a door opening and the open rear end of a vehicle positioned adjacent the door opening and comprising a frame structure intermediate the vehicle and the door opening and a sealing device mounted on the frame structure adjacent the rear end of the vehicle and comprising:
    a. a rigid, elongated fastening member constituted by an angular profile having flanges defining an open channel-shaped space therebetween;

b. a collapsible, elongated sealing member constituted by an elongated pad structure having an airtight, flexible wall defining a casing and a collapsible resilient material enclosed therein to hold the pad structure distended, the sealing member being mounted within the channel-shaped space in the fastening member and extending outwardly therefrom beyond said channel-shaped space;

c. vacuum means connected to the channel-shaped space in the fastening member and communicating with the interior of the pad structure, the vacuum means being operable to apply vacuum to the pad structure to collapse the pad structure and cause the same to be wholly retracted into the channel-shaped space in the fastening member; and d. clamping bolts connecting the fastening member with the frame structure and each formed with a channel communicating with the interior of the pad structure and with at least one side opening adapted to connect the channel with the vacuum means for collapsing the pad structure.

5. A sealing device as claimed in claim 1 in which the elongated fastening member comprises an angular profile of substantially L-shaped cross-section.

* * * * *

UNITED STATES PATENT AND TRADEMARK OFFICE
CERTIFICATE OF CORRECTION

PATENT NO. : 4,020,607

DATED : May 3, 1977

INVENTOR(S) : Bjervig, Leon Hans-Hother

It is certified that error appears in the above-identified patent and that said Letters Patent are hereby corrected as shown below:

On the cover sheet, left column, below item [63], should appear

-- [30] Foreign Application Priority Data
April 16, 1973 Denmark........2060/73
November 27, 1973 Denmark.....6387/73--

Signed and Sealed this twelfth Day of July 1977

[SEAL]

Attest:

RUTH C. MASON
*Attesting Officer*

C. MARSHALL DANN
*Commissioner of Patents and Trademarks*